United States Patent
Ross

[11] 3,720,374
[45] March 13, 1973

[54] IRRIGATION LINE MOVE

[76] Inventor: Warren N. Ross, 2123 N. First St., Hermiston, Oreg. 97838

[22] Filed: Feb. 25, 1971

[21] Appl. No.: 119,025

Related U.S. Application Data

[63] Continuation of Ser. No. 836,739, June 26, 1969, abandoned.

[52] U.S. Cl..................................239/177, 239/212
[51] Int. Cl. ..................................................B05b 3/00
[58] Field of Search ......239/177, 212, 213; 137/344; 52/655

[56] References Cited

UNITED STATES PATENTS

| 3,608,826 | 9/1971 | Reinke | 239/177 |
|---|---|---|---|
| 3,566,911 | 3/1971 | Neier | 137/344 |
| 1,346,843 | 7/1920 | Ramen | 239/213 |
| 3,558,258 | 1/1971 | Johnson, Jr | 239/212 X |
| 3,562,994 | 2/1971 | Linsowe | 239/212 |
| 3,598,142 | 10/1971 | Neier | 239/212 |

*Primary Examiner*—Allen N. Knowles
*Assistant Examiner*—John J. Love
*Attorney*—Buckhorn, Blore, Klarquist & Sparkman

[57] ABSTRACT

An irrigation line move has a pipe supported by carriages with flexible, tapered trusses below the pipe extending between the carriages with the central portions of the trusses rotatable on and slidable along the pipe. Control boxes over the carriages mount switches which are actuated by bars attached to the pipe to stop the carriages when excessive misalignment is approached. A center pivot water supply device has a flushing exit, and a slip ring connector for electrical power to electric motor drives of the carriages. The carriages have adjustable wheel supports to provide toe-in.

13 Claims, 15 Drawing Figures

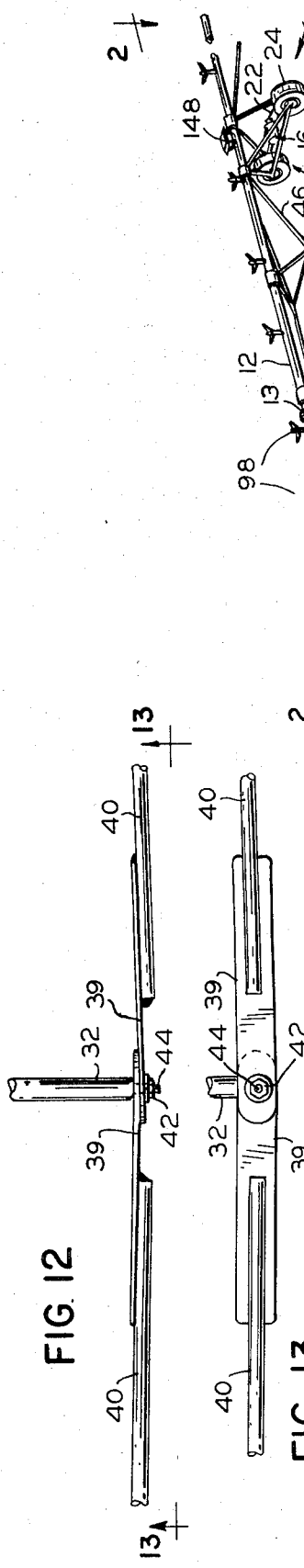
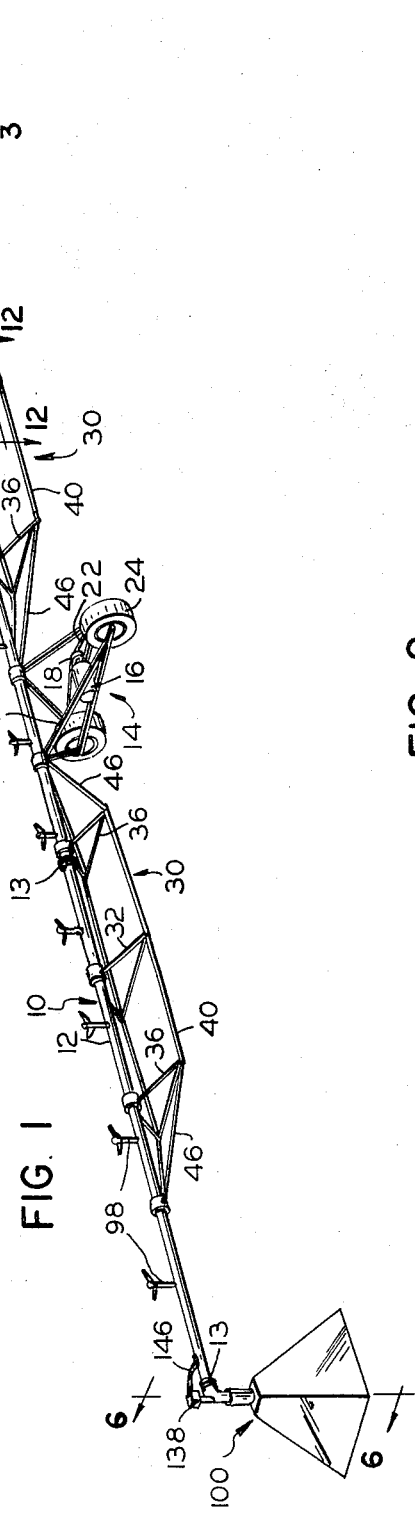
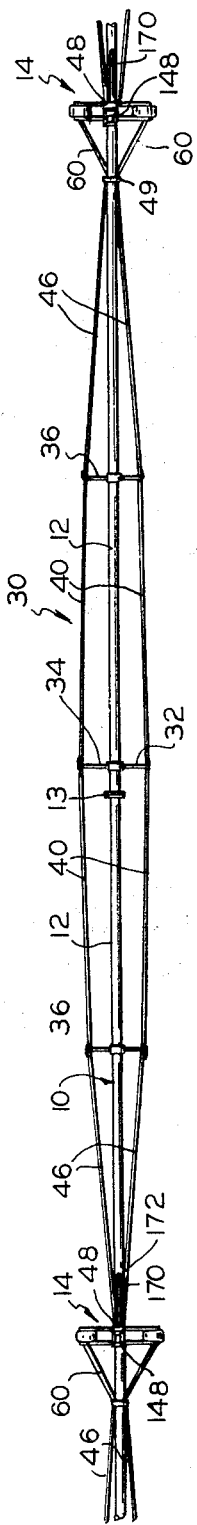

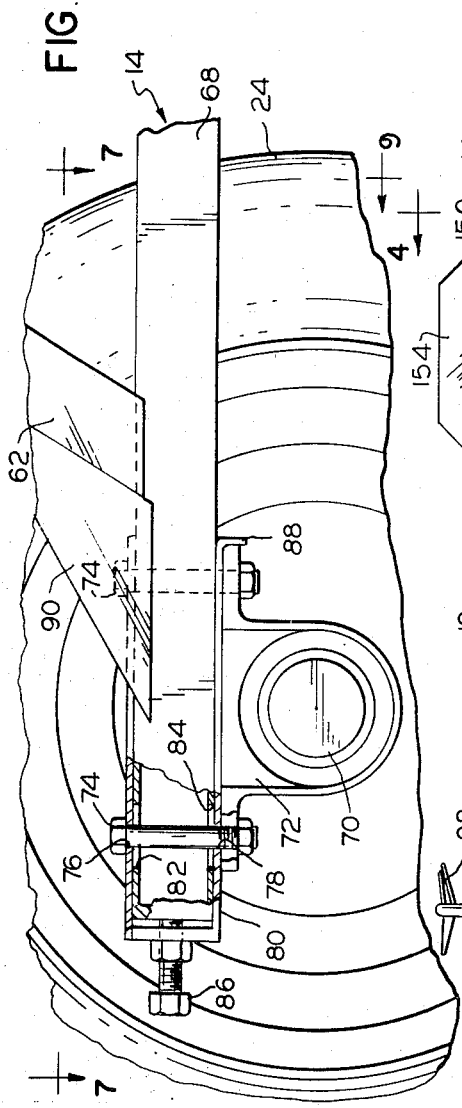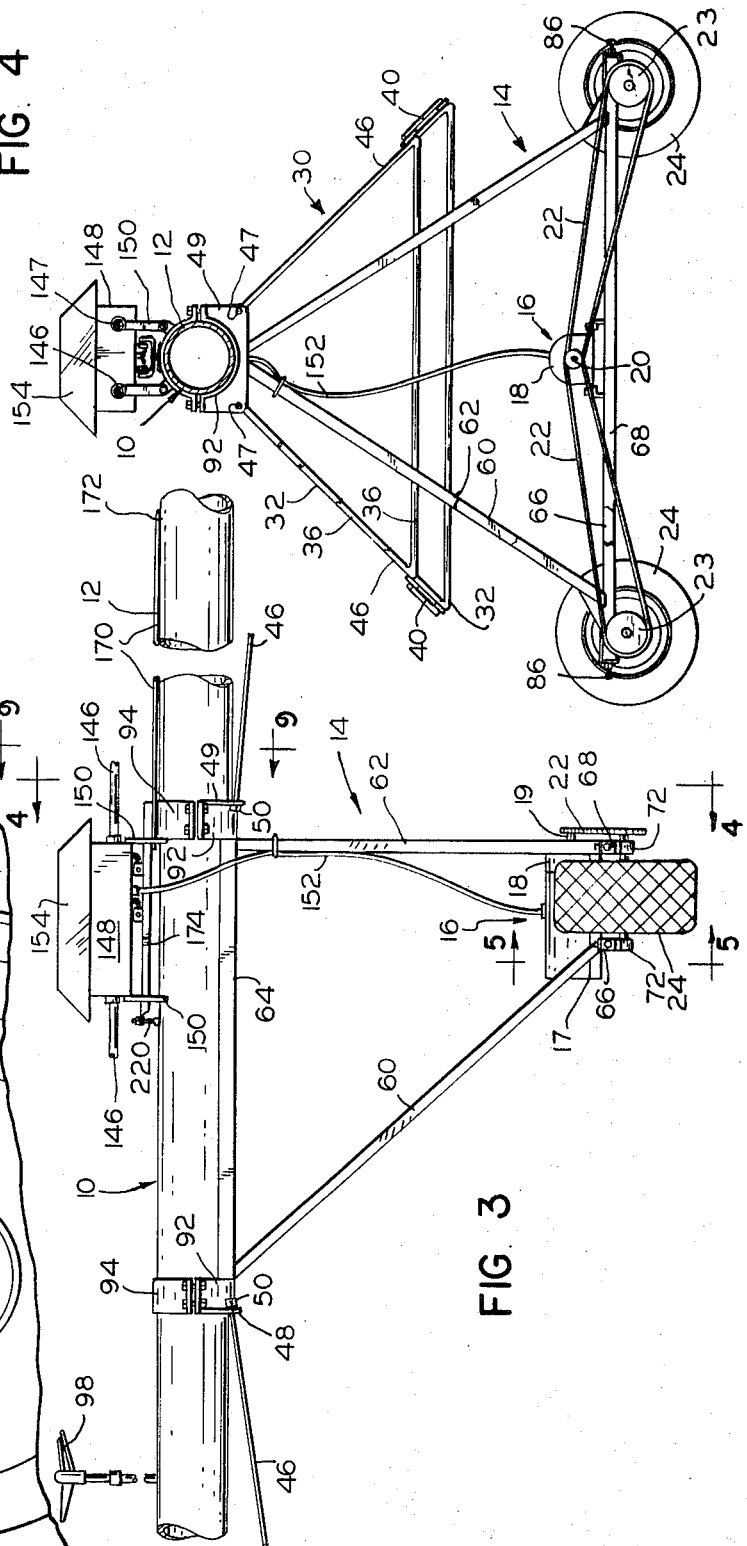

WARREN N. ROSS
INVENTOR
BY
BUCKHORN, BLORE, KLARQUIST & SPARKMAN
ATTORNEYS

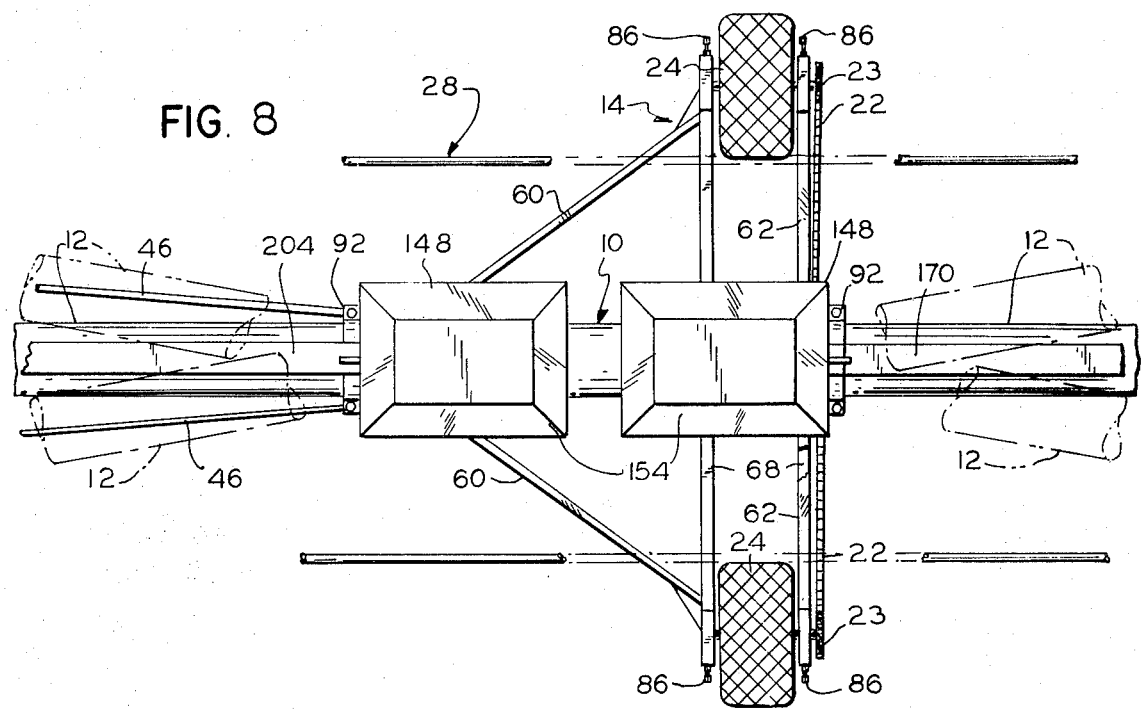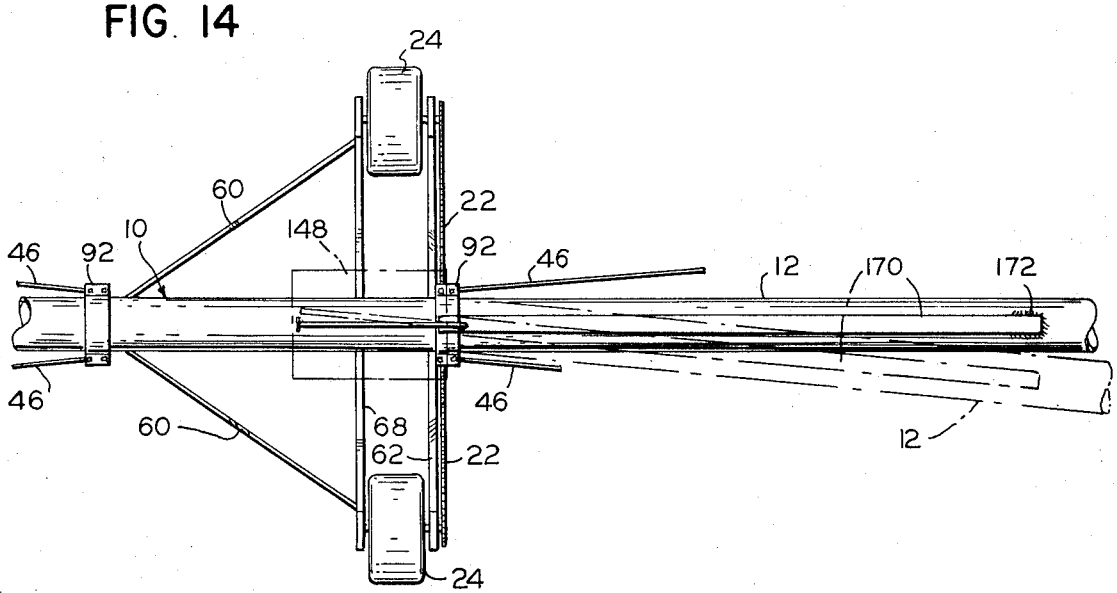

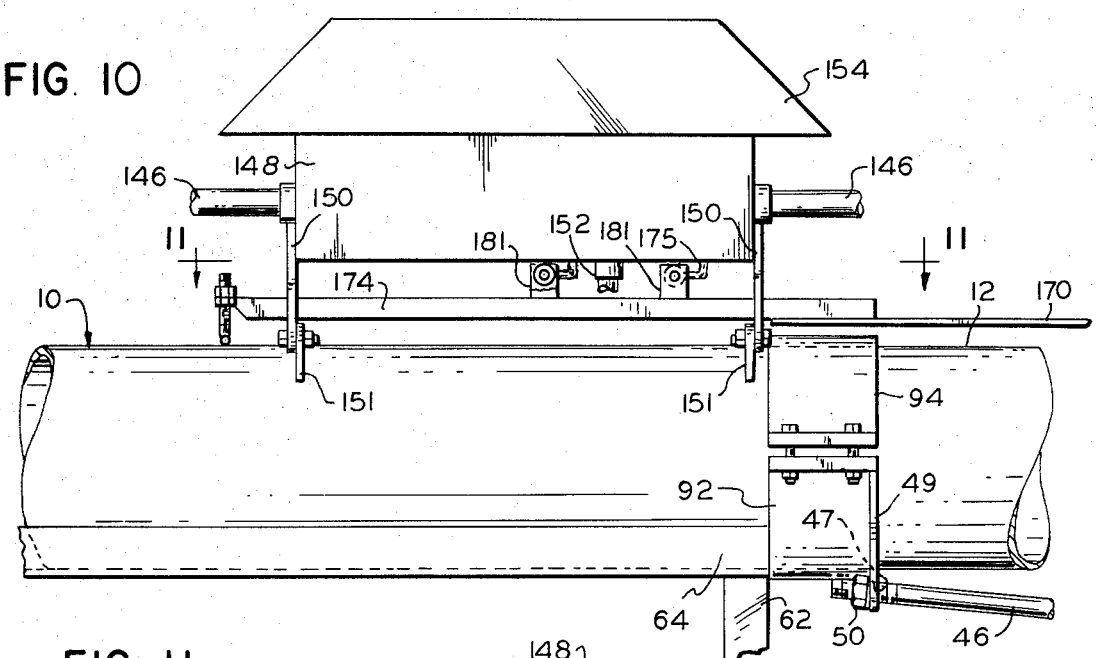
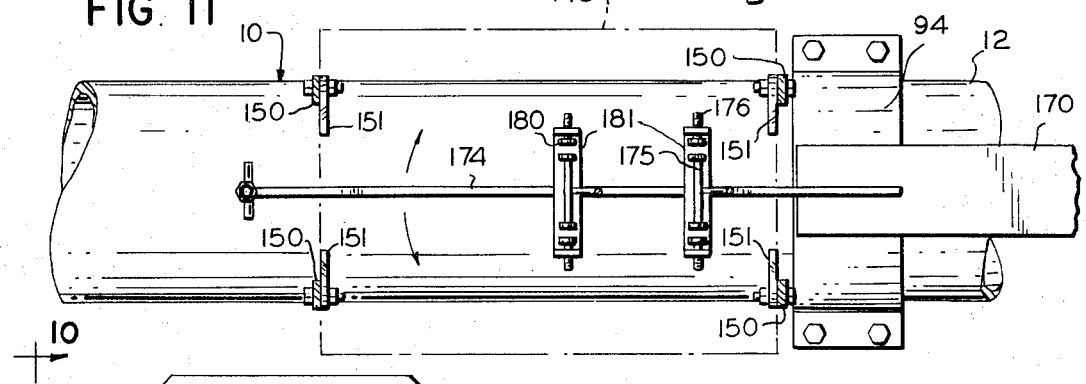
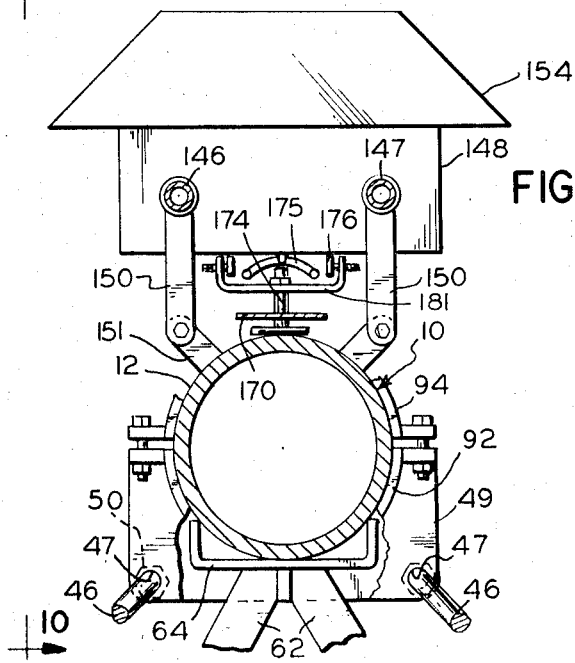

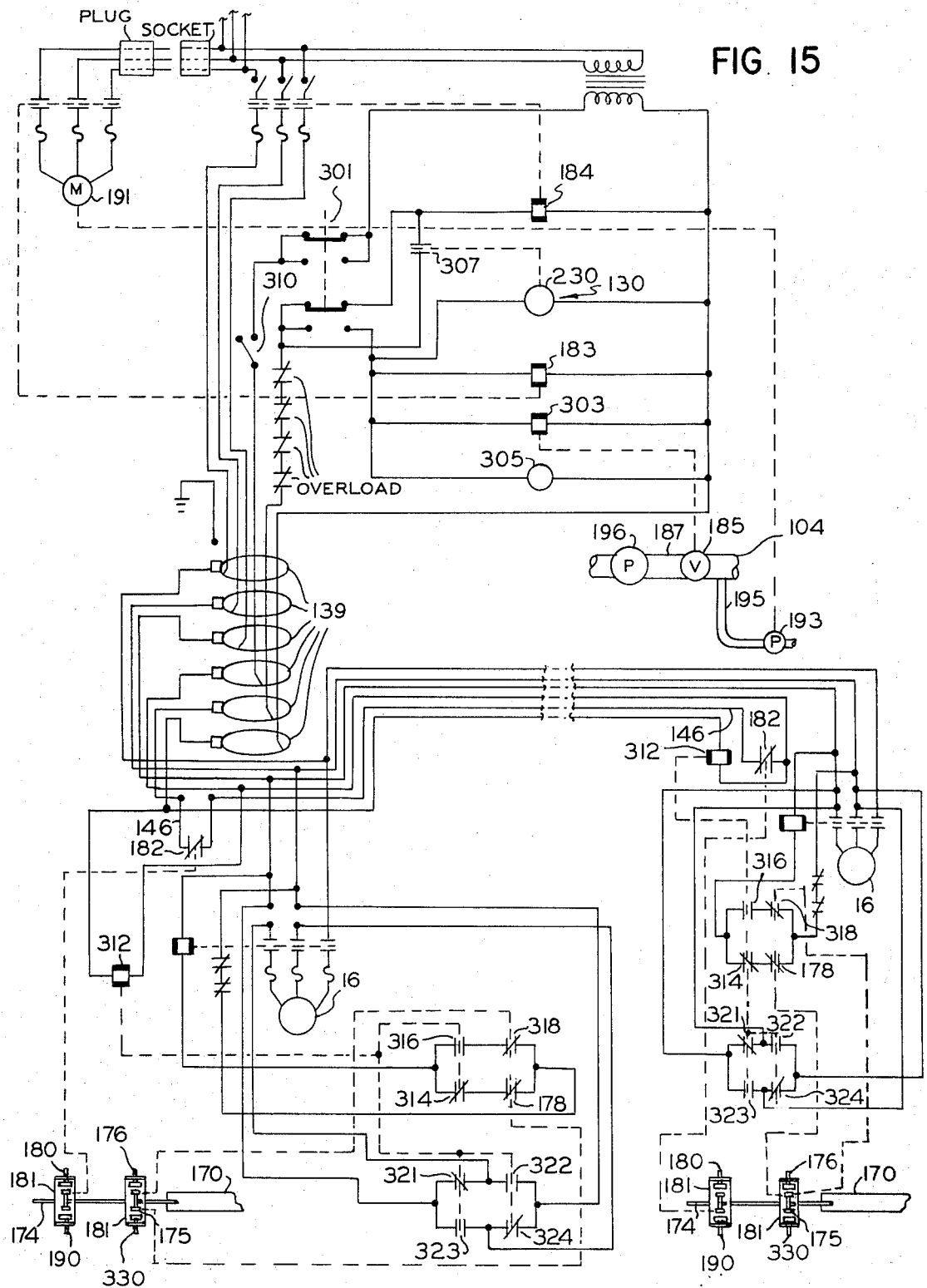

IRRIGATION LINE MOVE

This application is a continuation of applicant's copending application, Ser. No. 836,739, filed June 26, 1969, now abandoned.

DESCRIPTION

This invention relates to a new and improved irrigation line move, and more particularly to a new and improved trussed irrigation line move.

An object of the invention is to provide a new and improved irrigation line move.

Another object of the invention is to provide a new and improved trussed irrigation line move.

A further object of the invention is to provide an irrigation line in which a pipe thereof is supported by flexible trusses mounted rotatably on and slidable along the pipe and extending between carriages supporting the pipe.

Another object of the invention is to provide an irrigation line move having a flexible pipe and actuating bars secured at spaced points to the pipe and adapted to actuate controls when the pipe flexes to predetermined extents.

Another object of the invention is to provide an irrigation line move having a center pivot water supply device provided with an outlet pipe which may be opened to flush out debris and having a rotary electric connector to connect electric lines extending along the pipe to control and power circuitry.

The invention provides a new and improved irrigation line move including a flexible irrigation pipe, a plurality of carriages supporting the pipe and a plurality of trusses tapering from large at the central portions thereof to smaller at the ends thereof secured at the ends thereof to the carriages and secured rotatably to the pipe at the central portions of the trusses. Preferably the trusses include tension members positioned below the level of the pipe. In one specific embodiment, the line may include a misalignment detector in the form of a bar secured at one end to the pipe and adapted to actuate a control switch remote from the one end when the pipe is bent to predetermined extent. Also, the line move may be of the center pivot type including a water supplying pipe on the upper end of which may be mounted a rotatable coupling and having a flushing pipe normally closed by a valve, and a slip ring type, rotary electrical coupling at its upper end.

In the drawings:

FIG. 1 is a fragmentary, perspective view of an irrigation line move forming one embodiment of the invention;

FIG. 2 is an enlarged, fragmentary, top plan view taken along line 2—2 of FIG. 1;

FIG. 3 is an enlarged, fragmentary, side elevation view taken along line 3—3 of FIG. 1;

FIG. 4 is an enlarged vertical sectional view taken along line 4—4 of FIG. 3;

FIG. 5 is an enlarged, fragmentary, side elevation view taken along line 5—5 of FIG. 3;

FIG. 8 is an enlarged, fragmentary, top plan view of a portion of the irrigation line move of FIG. 1;

FIG. 9 is an enlarged vertical sectional view taken along line 9—9 of FIG. 3;

FIG. 10 is an enlarged, fragmentary, side elevation view taken along line 10—10 of FIG. 9;

FIG. 11 is an enlarged, fragmentary, vertical sectional view taken along line 11—11 of FIG. 10;

FIG. 12 is an enlarged, fragmentary, horizontal sectional view taken along line 12—12 of FIG. 1;

FIG. 13 is an enlarged, fragmentary, side elevation view taken along line 13—13 of FIG. 12;

FIG. 14 is an enlarged, fragmentary, top plan view of an actuator structure of the irrigation line move of FIG. 1; and FIG. 15 is a diagrammatic view of a control circuit of the irrigation line move of FIG. 1.

Figure 6:
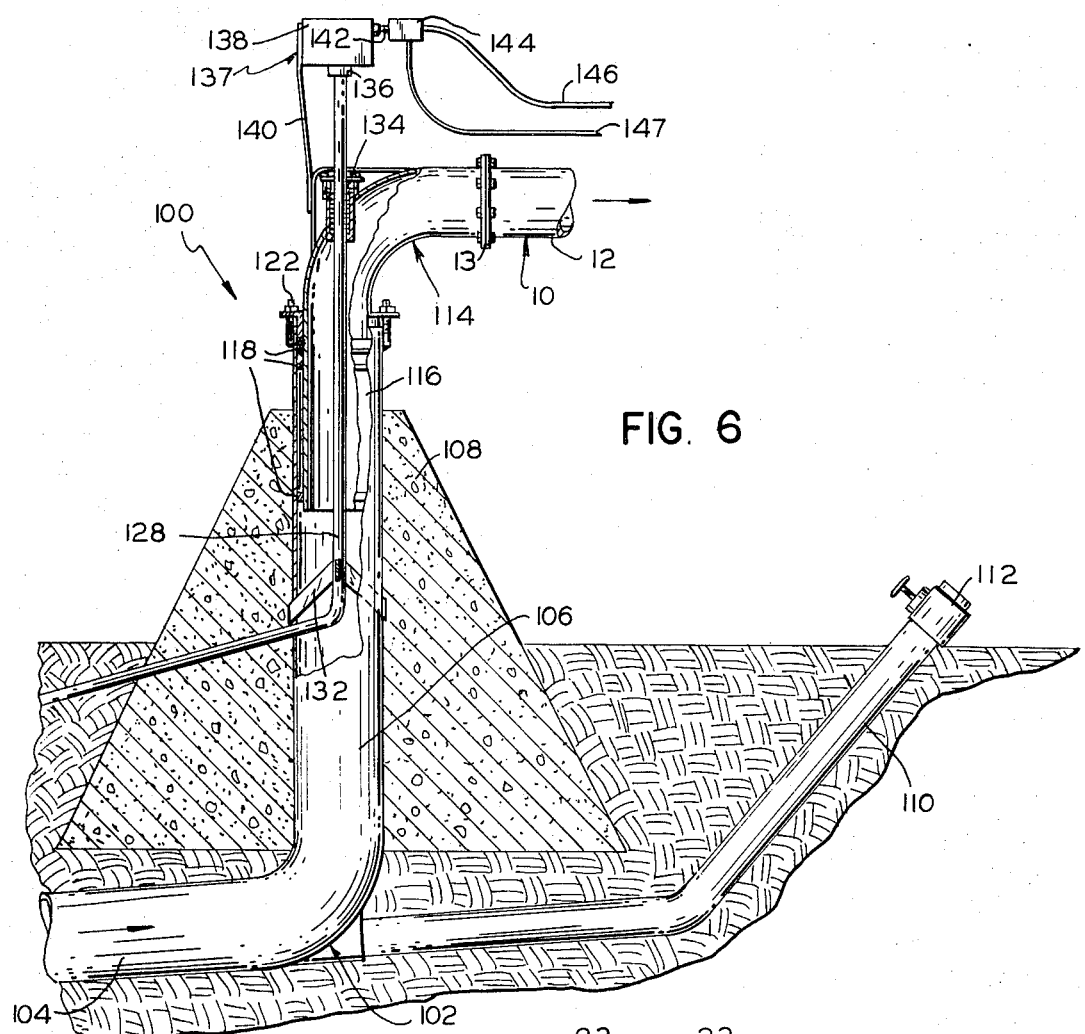
FIG. 6 is an enlarged, fragmentary, vertical sectional view taken along line 6—6 of FIG. 1.
Figure 7:
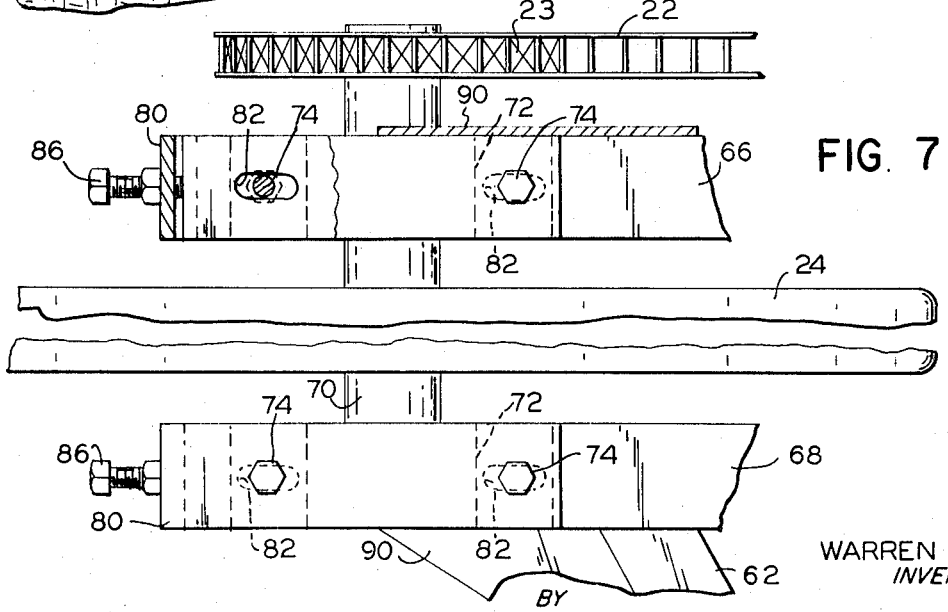
FIG. 7 is an enlarged, fragmentary, horizontal sectional view taken along line 7—7 of FIG. 5.

Referring now in detail to the drawings, there is shown therein an irrigation line move forming one embodiment of the invention and including a continuous, high strength, flexible steel pipe 10 having flanged pipe lengths 12 rigidly bolted together at the flanged ends 13 thereof and of substantially uniform flexibility throughout its length. The pipe is supported at spaced points by carriages 14, each of which is driven by an electric motor drive 16 having an electric motor 17 and a gear reducer 18 (FIGS. 3 and 4) to drive sprockets 20 which drive chains 22 and sprockets 23 to drive rubber tired, flotation and traction wheels 24. Overhead trusses 28 (FIG. 1) span the end carriages and provide beam support to the end portions of the pipe 10.

Tapered, floating trusses 30, which are positioned below the pipe and secured at both ends of each truss to the adjacent carriages, provide beam support to the pipe, resist twisting of the pipe, and assume substantial portions of both longitudinal tension and longitudinal compression loads on the irrigation line. Each of the trusses 30 includes a rigid, triangular, center frame 32 mounted rotatably on and slidably along the pipe 10 by strap-like split collar 34 which freely rotates and freely slides on the pipe. Each truss 30 also includes two rigid, triangular outer frames 36 which are somewhat smaller than the frame 32, and each frame 36 is located about halfway between the frame 32 and the adjacent end of the truss 30. Each frame 36 is mounted rotatably on and slidably along the pipe by a strap-like split collar 38. The members of the frames 32 and 36 are preferably substantially rigid metal tubes welded together at the apices of the frames. Perforated end plates 39 (FIGS. 12 and 13) rigid on rod members 40 are secured by nuts 42 and angularly extending threaded pins 44 rigid with the frames 32 and 36 to the lower apices of the frames 32 and 36 to connect these apices of one frame to those of the adjacent frame or frames. The frames 32 and 36 are connected sufficiently rigidly to the rod members 40 to keep the frames 32 and 36 in parallel planes substantially perpendicular to the pipe. Perforated end plates (not shown) like the plates 39 and rigidly connected to the rod members 46 (FIGS. 1 and 2) are connected by the nuts 42 and the pins 44 to the apices of the frames 32 and to the rod members 40. The opposite end portions of the rod members 46 are threaded, extend somewhat loosely and rotatably through holes 47 (FIGS. 3, 4 and 9) in connector plates 48 and 59 rigidly fixed on opposite ends of the carriages. The rod members 46 are secured to the connector plates 48 and 49 by nuts 50 screwed onto the rod members 46 and abutting the connector plates. The frames 32 and 36 form similar triangles with the base of the frame 32 being wider than the base of each frame 36, with the frames 36 being spaced equal distances apart from the frame 32 and the frames 36 each being spaced the same distance from the frame 32 as the space between that frame 36 and the adjacent connector plate 48 or 49.

The holes 47 in the connector plates 48 and 49 are spaced closely enough together to taper the end sections of the trusses 30 and lie, with the centerline of the pipe 10, on the apices of a triangle similar to but much smaller than the triangles of the frames 32 and 36, as best shown in FIG. 4. The somewhat close spacing together of the holes 47 to each other and to the centerline of the pipe imparts some flexibility into the end sections of the trusses 30 to permit the central portions of the trusses 30 to rotate substantially, as great as 45° in some instances, about the pipe, but the holes 47 are far enough apart from each other and from the centerline of the pipe to keep the end sections of the trusses 30 from being too flexible. In one constructed embodiment, the pipe 10 was six and one-half inches in diameter, the length of each of the bases of the frames 36 was four feet, the length of each of the bases of the frames 32 was five feet, each frame 36 was spaced twelve feet from the adjacent frame 32 and twelve feet from the adjacent connector plate 48 or 49, the length of the portions of the pipe between the connector plates 48 and 49 of each carriage was five feet, and the distance between each pair of the holes 47 in the connector plates was about ten inches.

Each carriage 14 (FIGS. 3, 4 and 5) has a rigid, truss-like frame including a rigid, triangular, sloping section 60 welded to the connector plate 48, a rigid, triangular, vertical frame 62 welded to the connector plate 49, a connector bar 64 welded to the connector plates 48 and 49 and cross-framing rigidly connecting base members 66 and 68 of the frames 60 and 62 and on which the drives 16 are mounted. Axles 70 carried by the wheels 24 are supported by self-aligning pillow block bearings 72 mounted adjustably on outwardly projecting end portions of the base members 66 and 68 by bolts 74 extending closely through holes 76 and 78 in a U-shaped slide 80 and extending loosely through slots 82 and 84 in the top and bottom portions of the members 68, which are square tubes. An adjustment screw 86 may be actuated to move each pillow block bearing 72 along its member 66 or 68 to toe in or cant the wheels 24 as desired. A flange 88 of the slide 80 longitudinally guides movement of the pillow block 72 under the slide 80 and gussets 90 welded to the members 66 and 68 and adjacent legs of the frames or sections 60 limit sidewise horizontal movement of the slides 80 relative to the members 66 and 68. This mounting of the bearings permits location of the axles 70 as desired to provide optimum chain tension and optimum toe-in of the wheels. The connector plates 48 and 49 have rigid lower clamp half portions 92 forming split clamps with clamp halves 94 and clamp the pipe 12 tightly to prevent rotation of the clamped portion of the pipe about its longitudinal axis and to prevent longitudinal movement of the pipe relative to the carriages 14.

The portion of the pipe over each carriage 14 is essentially stiff. The clamps 92 tightly hold the pipe in a position holding sprinklers 98 carried thereby in upright positions. The portions of the pipe between the carriages are supported somewhat flexibly, can twist enough to permit adjacent carriages to tilt forwardly or rearwardly in opposite directions, can flex vertically enough to permit the line to move over hills, undulating surfaces, and can flex horizontally enough to permit great horizontal misalignment of the carriages in the travel. The carriage frames are asymmetrical relative to the pipe 10, as illustrated in FIG. 3, preferably with the lefthand portion of each carriage frame pointing toward a center pivot and water supply device 100 (FIG. 1) and the righthand portion, as viewed in FIG. 3, vertical. However, this may be reversed if desired, with all the left-hand portion of the carriage frames directly over the wheels and the righthand portions of the carriage frames pointing away from the device 100.

The center pivot and water supply device 100 (FIGS. 1 and 6) includes an L-shaped supply pipe 102 having a horizontal portion 104 leading to a shutoff valve (not shown) and a vertical portion 106 projecting above the top of a concrete support 108. A flushing pipe 110 has a valve 112 which may be manually opened when desired to flush debris out of the supply pipe 102. A swivel elbow 114 connected to the pipe 10 has a vertical portion 116 swiveled in the upper portion of the portion 106 of the pipe 102. Spaced collars 118 welded to the portion 116 journal the portion 116 in the portion 106, and a packing gland structure 122 seals the portions 106 and 116 while allowing rotation of the portion 116 in the portion 106.

A waterproof electrical cable conduit 128 leading from a remote control power supply and control station 130 (FIG. 14) extends through the support 108 (FIG. 6) and the pipe 102 is supported by a spider 132 which also braces the pipe 102. The conduit 128 also extends axially along the portion 106 and through a packing gland 134 in the elbow to a position above the elbow 106 and the elbow is rotatable around the conduit. The conduit supports a base 136 of a well known, commercially available, swiveled connector box 137 having an inverted cup-shaped housing 138 supported by a vertical bar 140 welded to the elbow 114. The base 136 and the housing 138 carry slip ring connectors 139 (FIG. 14) connecting the conductors in the conduit 128 (FIG. 6) to conductors in a conduit 142 leading to and supporting a junction box 144 from which control and power conduits 146 and 147 extend. The conduits 146 are waterproof and extend along and are carried by the pipe 10 to control boxes 148 (FIGS. 10 and 11) carried by corner posts 150 secured to ears 151 welded to the pipe 10, with the bores 148 in positions substantially directly over the wheeled portions of the carriage 14 and close to the connector plates 49. Power conduits 152 lead from the control boxes 148 to the motor drives 16. Shed-like covers 154 are detachably secured to the control boxes.

As best shown in FIGS. 3, 4 and 10, to limit the extent that each carriage 14 can get out of alignment with the carriage on either side thereof, an actuator bar 170 of spring steel is welded to the top of the pipe 10 along a short end portion 172 (FIG. 14) of the bar spaced about five feet away from the adjacent carriage 14 and connector plate 49. The bar 170 is rigid horizontally and flexible vertically throughout all portions except vertical end portion 174. End portion 174 of the bar 170 is in a vertical plane including the centerline of the pipe 10 when the portion of the pipe below the bar is not flexed horizontally, which is the case when the immediate carriage (that is, the carriage most adjacent the bar) is exactly abreast of the carriages adjacent it. However, if the immediate carriage gets too far ahead of the adjacent carriage to its right, as viewed in FIGS. 1, 2 and 3, the portion of the pipe between the connecting plate 49 and the portion 172 of the actuator bar 170 flexes as shown in broken lines in FIG. 14 and an adjustment screw 176 (FIG. 15) carried by the fork 175 rigidly mounted on the free, vertical, end portion 174 (FIGS. 10 and 11) of the bar 170 engages a pivotal forked arm of a toggle switch 178 and swings the forked arm from its normal position to an actuated condition to open the switch 178 to cut off power to the motor drive 16 of the immediate carriage. Each switch 178 is fixedly mounted on the base of its control box and the shaft of the control switch extends downwardly through the base. The immediate carriage then stops until the adjacent carriage on its right comes more nearly abreast to straighten the pipe and move the adjustment screw 176 of the fork 175 away from the forked arm 178, which causes the switch 178 to reclose to again start the motor drive 16. If the switch 178 should fail to be opened for any reason, further lead of the immediate carriage causes the adjustment screw 180 of switch operating fork 181 on the bar 170 to open master switch 182 in control line 146 to cause shutoff relays 183 and 184 to shut valve 185 in water supply line 187 to cut off all power to all the motor drives 16, stop the entire line and stop pump 196. Normally each motor drive is shut off periodically when its carriage periodically leads beyond a predetermined extent the adjacent carriage on farther from the pivot of the line and no control for normal lag of the immediate carriage is provided. However, if the lag of the immediate carriage should approach an excessive extent, an adjustment screw 190 on the fork 181 opens the switch 182 in the control line 146 to stop the whole line and the pump 196. The valve 185 is adjacent the pivot device 100 and in the water supply pipe 102. A motor 191 driving a pump 193 also is automatically deenergized whenever the relay 183 is dropped out.

The drive of each of the carriages, except that of the outermost carriage most remote from the pivot of the line and the next to the outermost carriage, is controlled by the actuator bars 170 and switches 178 and 182 like those just described above. However, since each of the carriages so controlled is stopped only by its lead over the carriage next farther out approaching an excessive condition and the outermost carriage having no carriage beyond it, the outermost carriage is controlled by an actuator bar 204 (FIGS. 8 and 15) adjacent the next to the outermost carriage shown in FIG. 8, which actuates one of the limit switches 178 to stop the outermost carriage when the latter leads too far. To prevent the next to the outermost carriage (the penultimate carriage) from excessively leading the outermost carriage, an actuator bar 204, like the bar 170 but reversed, positioned inwardly of the penultimate carriage actuates a limit switch 178 when the penultimate carriage approaches an excessive lead relative to the outermost carriage. Switches 182 corresponding to and in series with the other switches 182 in the control line 146 are provided for the bars 170 and 204 to shut down the drive and water supply and fertilizer of the entire line if either of the outermost two carriages leads or lags excessively.

The actuator bars 170 and 204 are sufficiently strong and are tilted sufficiently, though slightly, upwardly to keep shoes 220 (FIG. 2) just barely touching the pipe when any adjacent portion of the pipe is bowed upwardly the maximum extent occurring in the operation of the line. Each shoe 220 has a low friction, pipe-engaging portion and slides freely across the pipe even when the adjacent portion of the pipe is bowed upwardly the maximum extent.

An adjustable timer 230 (FIG. 15) is adapted to be adjusted manually to interrupt the drives 16 periodically for short periods of time if it is desired to slow the line down from its maximum speed. Since the carriages travel shorter paths the farther inwardly from the outer end of the line the carriages are, the gear reducers are of different gear ratios to approximately compensate for the different speeds required. Preferably, the ratios of the gear reducers are such relative to each other that each carriage is driven slightly faster than the immediately adjacent carriage which is more outward from the center pivot. This tends to cause the line to normally curve slightly backwardly from the center pivot outwardly.

A manual switch 301 (FIG. 15) may be set in an upper, manual position in which relay 184 is kept on by the switch and the timer 230, solenoids 183 and 303, and hour meter 305 of an automatic control circuit are deenergized. The switch 301 also may be set manual in a lower, automatic position in which timer contacts 307 control the relay 184 and the timer 230 and the solenoids 183 and 303 and the meter are energized. The line may be run forwardly when a manual switch 310 (FIG. 15) is open. However, when the switch 310 is set in a closed position, relays 312 are energized to open contacts 314 in series with the switches 178 and to close parallel contacts 316, which are in series with normally closed limit switches 318. The relays 312 also reverse contacts 321, 322, 323 and 324 to the motor drive 16 to reverse the direction of the drive. Whenever one of the carriages gets too far ahead, the bar 170 or 204 causes adjustment screw 330 on the fork 175 to move the fork to open the switch 318. This stops the motor drive 16 until the lead of that carriage is reduced.

The floating trusses 30 impart high flexibility to the line move and permit the line move to be used successfully on rough ground as well as on level ground. The line can twist and flex or snake greatly without stopping and with no excessive stress applied to the line move. In one embodiment, the line move was a quarter of a mile in length and operated continuously even though the outermost carriage was over 300 feet out of alignment with the innermost carriage, no excessive strain on the pipe occurring. The floating nature of the trusses 30 and the flexibility of the end portions thereof permit the portions of the pipe 10 between the carriages to flex without such restraint as to highly stress the pipe in localized areas while vertical beam support to the pipe still is provided by the trusses 30. The trusses 30 are preferably adjusted to a condition where they are rather lightly stressed when the pipe 10, while filled with cold water, is perfectly straight, which may be described as a neutral condition of the trusses. However, when the pipe is flexed or twisted the trusses 30 are stressed to resist such bending or twisting the pipe to the extent of relieving large portions of the stress but do not resist so greatly as to deprive the pipe of a great degree of flexibility. This flexibility permitted by the trusses 30 enables the line to be used on rough terrain and with the carriages extensively misaligned relative to each other. When one of the carriages leads a carriage adjacent thereto, the portion of the truss 30 extending therebetween and adjacent the leading carriage rotates somewhat to the rear of the pipe which rotation is permitted by the rotating connections between the frames 32 and 36 of the pipe. The reverse is true when one of the carriages lags an adjacent carriage.

The above-described line move, while shown as a center pivot line, obviously can be used as a straight line move with minor changes obvious to those skilled in the art. The floating trusses, while providing excellent beam support to the pipe, also prevent concentration of stress at localized portions of the pipe. As a result, the carriages have wide allowable limits in misalignment, opposite tilting forwardly and rearwardly of adjacent carriages is permitted, and the pipe can have large total twist and flexing with no breakage. By having each carriage drive stopped only when that carriage approaches an excessive lead relative to the adjacent carriage, the slowest carriage always is running, which keeps the line moving at the maximum speed of that slowest carriage.

What is claimed is:

1. In an irrigation line move,
an elongated pipe of substantially uniform flexibility along its entire length,
sprinkler means supplied by the pipe,
a plurality of carriages secured to short sections of the pipe spaced apart by long sections of the pipe and supporting the pipe,
and a plurality of trusses mounted under the long sections,
each truss having tapered truncated end portions secured to the carriages and a central portion secured to the pipe.

2. The irrigation line move of claim 1 wherein
each truss includes a plurality of triangular transverse frames engaging the pipe at one apex of each frame, and a pair of tension members secured to the other apices of the frames,
the ends of the tension members being secured to the carriages at points at opposite sides of the pipe.

3. The irrigation line move of claim 2 wherein said points are positioned below the centerline of the pipe.

4. The irrigation line move of claim 3 including switch means having a box mounted above the pipe and substantially directly over one of the carriages,
the switch means including an actuator supported by the box in a position between the box and the pipe,
motor means carried by one of the carriages and controlled by the switch means,
and a bar secured at one end to the pipe at a point along one of the long sections and extending freely along the pipe to the actuator for moving the actuator when the pipe is curved.

5. The irrigation line move of claim 1 including a bar extending along the top of the pipe and fixed rigidly to the pipe at an end portion of the bar at a point spaced along the pipe from one of the carriages,
the remainder of the bar being movable relative to the pipe,
motor means for driving one of the carriages,
switch means for controlling the motor means and having an actuator,
and a switch box above the pipe and mounting the switch means over the first mentioned one of the carriages with the actuator positioned between the box and the pipe and in the path of movement of the box when the pipe is curved.

6. In an irrigation line move,
a flexible irrigation pipe,
sprinkler means carried by the pipe,
a plurality of carriages supporting the pipe at points spaced therealong and supporting the pipe in a generally horizontal position,
and a plurality of trusses tapering from large at the central portions thereof to smaller at the ends thereof, secured at the ends thereof to the carriages and including means securing the central portions of the trusses rotatably to the pipe.

7. The irrigation line move of claim 6 wherein the trusses include tension members normally disposed below the level of the pipe.

8. In combination,
a pair of spaced supporting members,
an elongated flexible pipe member connected to the supporting members,
sprinkler means carried by the pipe member,
triangular frame means mounted at one apex thereof rotatably on the pipe member and spaced substantially from both supporting members,
and pairs of tension members secured to the other apices of the frame means and to the supporting members.

9. The combination of claim 8 wherein the portions of the tension members of each pair thereof secured to one of the supporting members are spaced apart a predetermined distance and the portions of the last-mentioned pair of tension members secured to the frame means are spaced apart a distance substantially greater than said predetermined distances.

10. The combination of claim 8 wherein the supporting members are carriages.

11. The combination of claim 10 wherein the pipe member is an irrigation pipe.

12. In an irrigation line move,
an elongated pipe of substantially uniform flexibility along its entire length,
sprinkler means supplied by the pipe,
a plurality of carriages clamped to portions of the pipe spaced therealong and supporting the pipe,
and a plurality of trusses having tapered, truncated end portions secured to the carriages against rotation relative to the pipe and rotatable on and slidable along the portions of the pipe between the carriages.

13. In an irrigation line move,
a flexible irrigation pipe,
sprinkler means carried by the pipe,
a plurality of carriages supporting the pipe at points spaced therealong and supporting the pipe in a generally horizontal position, and a plurality of trusses tapering from large at the central portions thereof to smaller at the ends thereof, secured at the ends thereof to the carriages and including means securing the central portions of the trusses rotatable to the pipe, each truss including a plurality of triangular frames mounted at one apex of each rotatably on the pipe, connectors securing the frames together at the other apices thereof, and pairs of connecting members secured to the carriages and to said other apices of the frames.

* * * * *